United States Patent [19]

Matsuura et al.

[11] 4,399,055

[45] Aug. 16, 1983

[54] CARRIER OF CATALYST AND CATALYST COMPONENT COMPOSED OF THE CARRIER, FOR POLYMERIZATION OF OLEFINS, AS WELL AS PROCESSES FOR PRODUCTION THEREOF

[75] Inventors: Mitsuyuki Matsuura, Kameyama; Takashi Fujita, Yakkaichi, both of Japan

[73] Assignee: Mitsubishi Petrochemical Company Limited, Tokyo, Japan

[21] Appl. No.: 370,666

[22] Filed: Apr. 22, 1982

[30] Foreign Application Priority Data

May 1, 1981 [JP] Japan .................................. 56-66229
Jul. 3, 1981 [JP] Japan ................................ 56-103205
Jan. 23, 1982 [JP] Japan .................................... 57-9070

[51] Int. Cl.³ ............................. C08F 4/02; C08F 4/64
[52] U.S. Cl. ............................... 252/429 B; 252/429 C; 252/441; 526/125

[58] Field of Search ................ 252/429 B, 429 C, 441

[56] References Cited

U.S. PATENT DOCUMENTS

| | | | |
|---|---|---|---|
| 3,925,338 | 12/1975 | Ort | 252/429 C X |
| 4,111,835 | 9/1978 | Foschini et al. | 252/429 B X |
| 4,296,223 | 10/1981 | Berger | 252/429 C X |
| 4,315,835 | 2/1982 | Scata et al. | 252/429 B |
| 4,324,876 | 4/1982 | Matsuura et al. | 252/429 B X |

Primary Examiner—Patrick Garvin
Attorney, Agent, or Firm—Oblon, Fisher, Spivak, McClelland & Maier

[57] ABSTRACT

A carrier of catalysts for polymerization of olefins is disclosed, which is produced from a magnesium halide and which is characterized by its granulometric properties. Production of a catalyst component for polymerization of olefins which comprises the carrier is also disclosed.

15 Claims, 4 Drawing Figures

CARRIER OF CATALYST AND CATALYST COMPONENT COMPOSED OF THE CARRIER, FOR POLYMERIZATION OF OLEFINS, AS WELL AS PROCESSES FOR PRODUCTION THEREOF

BACKGROUND OF THE INVENTION

This invention relates to a catalyst carrier in the form of solid particles which has excellent properties as a carrier of a catalyst for polymerization of olefins, to a catalyst component produced from the catalyst carrier, and to respective processes for production thereof.

In general, it has been desired that the carrier of a catalyst for polymerization of olefins have the following two properties.

(1) A catalyst obtained by causing a catalytically active component to be supported on a catalyst carrier can exhibit a high activity.

(2) When an olefin is polymerized by the use of a catalyst obtained by causing a catalytically active component to be supported on a catalyst carrier, the resulting polymer is spherical or approximately spherical and also has a high apparent density and good fluidity.

A catalyst carrier having the properties specified in (2) above can be said to have good "physical properties."

As the catalysts exhibiting excellent properties for polymerization of olefins, a variety of the so-called Ziegler-type catalysts have hitherto been known. It has also been known that the carriers for a catalyst produced from a magnesium compound such as a magnesium dihalide, a dialkoxymagnesium, magnesium hydroxide, magnesium oxide or a dialkylmagnesium are effective as the carriers for the Ziegler type catalysts.

However, the excellent performance of these conventional magnesium compounds as the catalyst carrier was mainly exhibited with respect to the effect of enhancing the catalytic activity as described in (1) above. The catalyst carriers produced from the conventional magnesium compounds were inadequate with respect to the physical properties of the catalyst as described in (2) above. The reason for this is that the principal objects of the researches on the catalysts for polymerization of olefins and especially on the carriers have been directed toward enhancement of the activities of the catalysts.

The physical properties of the catalyst, however, have very important functions that control the properties of the resulting polymers in the actual polymerization reaction of an olefins such as ethylene or propylene. In the industrial practice of the polymerization reaction of olefins, improvement in physical properties of the catalyst has been needed to obtain polymers having such excellent properties in a stable condition.

Thus, there has been a need for developing a novel catalyst carrier for enhancing activity in the polymerization reaction and also a need for providing a catalyst having excellent physical properties.

SUMMARY OF THE INVENTION

It is an object of the present invention to solve the above described problems and to obtain an excellent catalyst carrier and an excellent catalyst component for polymerization of olefins. This object can be achieved by the use of a solid component having specific structures and properties.

Thus, the catalyst carrier (A) of the present invention comprises solid particles produced from a magnesium halide and is characterized in that the carrier is composed of the tertiary particles each constituted by a large number of fine secondary particles, each of said secondary particles is constituted by a large number of very fine primary particles included therein, and the carrier composed of said tertiary particles has the following properties:

(a) a specific area in a range of 0.1 to 10 $m^2/g$,
(b) a void volume formed by the pores of not more than 10,000 Å of not more than 0.5 ml/g,
(c) a ratio of the average diameter of the tertiary particles to that of the secondary particles in a range of 50 to 200, and
(d) a ratio of the specific surface area of the carrier to that of a sphere having a diameter corresponding to the particle diameter of the tertiary particles in a range of 1 to 10.

Furthermore, the catalyst component of the present invention is prepared by contacting at least one of the following components (D) through (F) with the catalyst carrier component described above:

(D) a liquid titanium compound which must contain a halogen in the case where this component is used alone or in combination with the component (F),
(E) a silicon halide compound, and
(F) a polymeric silicone compound having a structural unit represented by the formula wherein R° is a hydrocarbon residue.

By the use of the catalyst carrier of the present invention, a catalyst having excellent physical properties for polymerization of olefins can be obtained. Moreover, by the use of the catalyst in the polymerization reaction, a polymer having good fluidity and excellent physical properties can be produced, which polymer is characterized in that (a) its particles are spherical or approximately spherical, (b) it has an apparent density of preferably not less than 0.40 (g/cc) and especially not less than 0.45 (g/cc), and (c) the angle of repose of the polymer is generally not more than 45°, preferably not more than 40° and especially not more than 35°.

To exhibit such effects, the catalyst carrier of the present invention is also required, as the conditions of the carrier, to have the following specific physical properties: the shape of the tertiary particles of the carrier is spherical or approximately spherical; the primary particles are densely packed in each of the secondary particles; the secondary particles are densely packed in each of the tertiary particles; large pores are not present; and the specific surface area of the catalyst carrier is small.

The mechanism under which the effects of the catalyst of the present invention can be exhibited has not been fully made clear, but the excellent effects may be considered to be attributable to the unique structures of the primary, secondary, and tertiary particles as well as the particular properties of the carrier as described above.

BRIEF DESCRIPTION OF THE ILLUSTRATIONS

In the illustrations.

DETAILED DESCRIPTION OF THE INVENTION

1. Physical structure of the carrier

Figure 1:
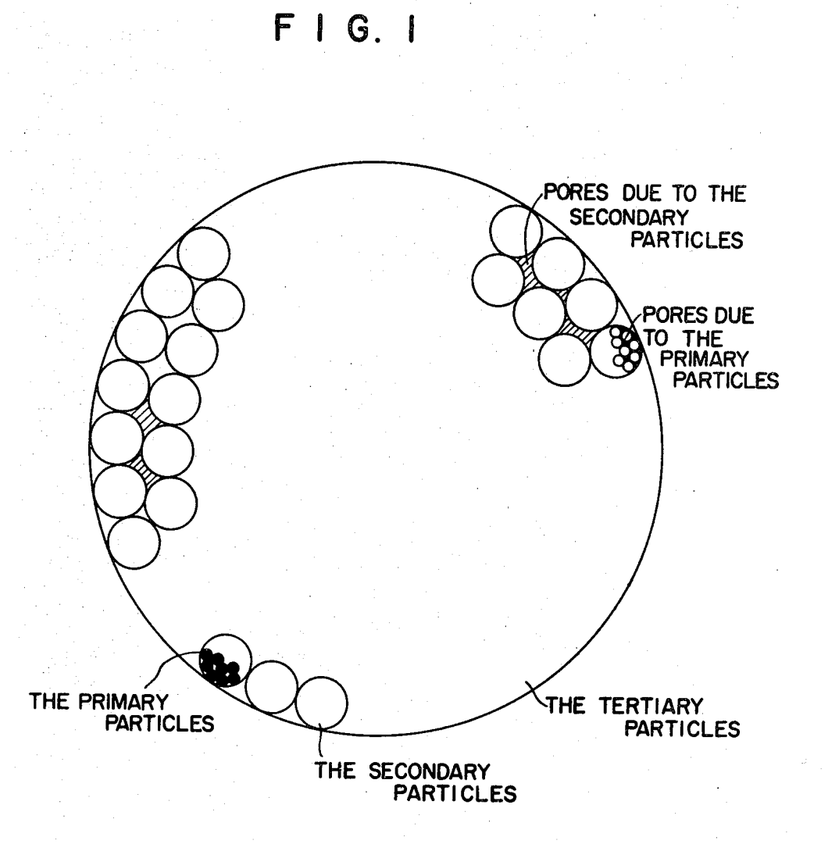
FIG. 1 is a diagrammatic representation showing a model of the physical structure of a catalyst carrier according to this invention.

As shown in the diagrammatic model representation of the catalyst carrier in FIG. 1, the catalyst carrier of the present invention is structurally characterized in that the secondary particles are constituted from very fine primary particles and the secondary particles gather together to constitute the tertiary particles of the carrier. The above described structure was confirmed under an electron microscope, and is characterized in that: the tertiary particles are spherical or approximately spherical; the primary particles are densely packed in each of the secondary particles; the secondary particles are densely packed in each of the tertiary particles; and thus the degrees of packing of both the primary and secondary particles are high.

2. Properties of the carrier (1) Specific surface area

The specific surface area of the catalyst carrier according to the present invention is in a range of 0.1 to 10 m$^2$/g, preferably 0.5 to 5 m$^2$g/, when measured after drying of the freshly-prepared carrier in accordance with the BET method, which is described in, for example, reference A. See Note A. The above mentioned range is considerably smaller than the specific surface area of conventional carriers of the catalysts for polymerization of α-olefins which have been generally known.

From this fact, it can be considered that the surface of the tertiary particles of the carrier according to the present invention is smooth without concavities and convexities, and both the primary particles and the secondary particles are packed so densely that there is no space for producing a large surface area in the tertiary particles.

(2) Void volume

The void volume of the present carrier which is formed by the pores of not more than 10,000 Å (angstrom) is not more than 0.5 ml/g, preferably not more than 0.3 ml/g. The reason for the void volume depending upon the pores of not more than 10,000 Å is the measurement of the inner pores among the primary and secondary particles in the tertiary particles and also the exclusion in the measurement of the outer pores formed among the tertiary particles.

As described above, the void volume as small as 0.5 ml/g which is formed by the pores of not more than 10,000 Å indicates that the number of pores within the tertiary particles is small, large pores are not present, and both the primary particles and secondary particles are densely packed.

The pores of not more than 10,000 Å is measured by a mercury penetration method, which is described in, for example, reference B. See Note B. In this case, the void volume of the carrier of the present invention corresponds to the volume of pores in the range of 10,000 Å to 70 Å in diameter. When the volume is more than 0.5 ml/g, the carrier is outside of the purview of the present invention because the space within the tertiary particles of the carrier becomes too large and the shape of the carrier is not spherical.

(3) The ratio of the diameter of the tertiary particles to that of the secondary particles As described above, the catalyst carrier of the present invention is structurally constituted from the primary, secondary and tertiary particles and is characterized in that the ratio of the average diameter of the tertiary particles to that of the secondary particles is in the range of 50 to 200, preferably 100 to 150.

The above mentioned ratio in conventional catalyst carriers is considerably small, being in the range of about 10 to about 30. In this connection, the size of the secondary particles in the carrier of the present invention is considerably smaller than the size of its tertiary particles. This is considered to be a very important condition for the tertiary particles of the carrier to be formed in spherical or approximately spherical shapes.

The average diameter is determined by the following method: A long diameter and a short diameter of a given particle of the tertiary and the secondary particles are determined shown on a photograph by a scanning type electron microscope, and the diameters are averaged to give a particle diameter d. The average diameter D is calculated by the equation: D=(Σnd/Σn) where n is the number of sample particles, and d is a particle diameter of each particle.

(4) The ratio of the specific surface area of the present carrier to that of a sphere having a diameter corresponding to the particle diameter of the tertiary particles The above mentioned ratio is in a range of from 1 to 10. The specific surface area of the above mentioned sphere is the value calculated, as a specific surface area of the perfect sphere having the corresponding particle diameter, from the average diameter of the tertiary particles of the carrier, which was measured under an electron microscope, and the density of the carrier which was separately measured.

In view of the fact that the ratio is as large as about 50 to about 100 in conventional catalyst carriers, it will be appreciated that the carrier of the present invention in comparison has a very small value of the ratio. Therefore, the present carrier has a smoother surface than the conventional ones, and both the primary particles and the secondary particles are densely packed.

3. Process for producing the carrier

The catalyst carrier of the present invention is produced from a magnesium halide and can be produced by any optional process provided that the product satisfies the above described conditions.

In the production process, together with a magnesium halide as the essential component, a solvent for the magnesium halide such as a titanic acid ester or a polytitanic acid ester and a treating agent for separating out solid particles such as a polymeric silicone compound are suitably selected. For example, the carrier of the present invention can be produced from the following components.

(a) A magnesium dihalide such as MgF$_2$, MgCl$_2$ and MgBr$_2$ (b) A titanic acid ester or a polytitanic acid ester The titanic acid ester is exemplified by Ti(OC$_2$H$_5$)$_4$, Ti(O—nC$_4$H$_9$)$_4$, Ti(O—nC$_5$H$_{11}$)$_4$, Ti(O—nC$_6$H$_{13}$)$_4$, Ti(O—nC$_7$H$_{15}$)$_4$, Ti(O—nC$_8$H$_{17}$)$_4$, Ti(O—nC$_{10}$H$_{21}$)$_4$, Ti(O—nC$_3$H$_7$)$_4$ and the like. These esters may be used alone or as mixtures thereof.

The polytitanic acid ester is selected, for example, from the compounds represented by the general formula wherein each of R$^1$, R$^2$, R$^3$ and R$^4$ is a hydrocarbon radical, which preferably has 1 to 10 carbon atoms, especially 2 to 6 carbon atoms, and n is a number in such a range that the polytitanic acid ester can be used in a liquid state (alone or as a mixed solution with other components) to contact the component (a) magnesium dihalide, which is an integer up to 20 preferably in the range of 2 to 14, especially in a range of the order of 2 to 10. More specifically, the esters include tetra-n-butyl polytitanate (n=2 to 10), tetra-n-hexyl polytitanate (n=2 to 10), tetraoctyl polytitanate (n=2 to 10) and the like.

The above described titanic acid ester or polytitanic acid ester can be used in combination with an electron donor, for example, a metal alkoxide such as Si(OR)$_4$, Zn(OR)$_4$, B(OR)$_3$ and Al(OR)$_3$, an alcohol, an ester, an ether, or the like.

(c) A polymeric silicone compound

The silicone compound is selected, for example, from the compounds represented by the following general formula, wherein R° is a hydrocarbon radiacal having 1 to 10 carbon atoms, especially 1 to 6 carbon atoms.

The polymeric silicone compound having such a structural unit is exemplified by methylhydropolysiloxane, ethylhydropolysiloxane, phenylhydropolysiloxane, and cyclohexylhydropolysiloxane. The degree of polymerization of these compounds is not especially restricted, but it is preferable that these compounds have a viscosity in a range of the order of 10 to 100 centistokes from the viewpoint of handling. In this connection, the end groups of the hydropolysiloxanes are preferably sealed by an inert group such as a trialkylenesilyl group, although the structure of the end groups does not have a great effect on the present invention.

When the carrier of the present invention is produced from these components (a), (b) and (c), the ratio of (a) to (b) to (c) to be used can be in a suitable range depending on the desired performance of the carrier. In general, a ratio of (b)/(a) in a range of 2 to 10, and preferably 2 to 5, and a ratio of (c)/(b) in a range of 1 to 20, preferably 2 to 5, is advantageous.

The carrier of the present invention can be produced, for example, by contacting and mixing these components (a), (b) and (c) in a temperature range of generally −100° to +200° C., preferably 0° to 100° C., for a time of the order of 10 minutes to 20 hours. The contact time is preferably in a range of the order of 1 to 5 hours.

The contact of the three components is preferably conducted under agitation, and preferably the components (a) and (b) are contacted to form a homogeneous solution of a magnesium dihalide, and then the component (c) is contacted with the solution to form a precipitate of the solid carrier.

The contact of the three components can also be conducted in the presence of a dispersion medium, examples of which are a hydrocarbon, a halohydrocarbon, and a dialkylpolysiloxane. Examples of the hydrocarbons include hexane, heptane, toluene, and cyclohexane. Examples of the halohydrocarbons include a chloro-n-butyl, 1,2-dichloroethylene, carbon tetrachloride, and chlorobenzene. Examples of the dialkylpolysiloxane include dimethylpolysiloxane and methylphenylpolysiloxane.

4. Production of the catalyst component for polymerization (1) Components (D)-(F)

The catalyst component of the present invention is characterized in that at least one of the following components (D) through (F) (more specifically, (D), (E), (D)+(E), (D)+(F), (E)+(F) or (D)+(E)+(F)) is contacted with the above described catalyst carrier component (A).

(D) a liquid titanium compound

By the term "liquid" herein is meant a liquid compound (including a complexed derivative of the compound in a liquid state) as well as a solution of the compound.

Typical examples of the titanium compound are compounds represented by the general formula Ti(OR$^2$)$_{4-n}$X$_n$, wherein: R$^2$ is a hydrocarbon residue having preferably 1 to about 10 carbon atoms; X stands for a halogen; and n is a number defined by $0 \leq n \leq 4$.

Specific examples of these compounds are TiCl$_4$, TiBr$_4$, Ti(OC$_2$H$_5$)Cl$_3$, Ti(OC$_2$H$_5$)$_2$Cl$_2$, Ti(OC$_2$H$_5$)$_3$Cl, Ti(O—iC$_3$H$_7$)Cl$_3$, Ti(O—nC$_4$H$_9$)Cl$_3$, Ti(O—nC$_4$H$_9$)$_2$Cl$_2$, Ti(OC$_2$H$_5$)Br$_3$, Ti(OC$_2$H$_5$)(OC$_4$H$_9$)$_2$Cl, Ti(O—nC$_4$H$_9$)$_3$Cl, Ti(O—C$_6$H$_5$)Cl$_3$, Ti(O—iC$_4$H$_9$)$_2$Cl$_2$, Ti(OC$_5$H$_{11}$)Cl$_3$, Ti(OC$_6$H$_{13}$). Cl$_3$, Ti(OC$_2$H$_5$)$_4$, Ti(O—nC$_3$H$_7$)$_4$, Ti(O—iC$_3$H$_7$)$_4$, Ti(O—nC$_4$H$_9$)$_4$, Ti(O—iC$_4$H$_9$)$_4$, Ti[O—CH$_2$CH(CH$_3$)$_2$]$_4$, Ti[O—C(CH$_3$)$_3$]$_4$, Ti(O—C$_5$H$_{11}$)$_4$, Ti(O—C$_6$H$_{13}$)$_4$, Ti(O—nC$_7$H$_{15}$)$_4$, Ti[OCH(C$_3$H$_7$)$_2$]$_4$, Ti[OCH(CH$_3$)C$_4$H$_9$]$_4$, Ti(OC$_8$H$_{17}$)$_4$, Ti(C$_{10}$H$_{21}$)$_4$, and Ti[OCH$_2$CH(C$_2$H$_5$)C$_4$H$_9$]$_4$.

Furthermore, the liquid titanium compound may be a molecular compound derived by reacting a compound represented by TiX'$_4$ (wherein X' stands for a halogen) with an electron donor. Examples of this compound are TiCl$_4$.CH$_3$COC$_2$H$_5$, TiCl$_4$.CH$_3$CO$_2$C$_2$H$_5$, TiCl$_4$.C$_6$H$_5$NO$_2$, TiCl$_4$.CH$_3$COCl, TiCl$_4$.C$_6$H$_5$COCl, TiCl$_4$.C$_6$H$_5$CO$_2$C$_2$H$_5$, TiCl$_4$.ClCO$_2$C$_2$H$_5$, and TiCl$_4$.C$_4$H$_4$O.

At least one of the components (D) through (F) used should contain a halogen. Thus, in the case where the component (D) is used alone or the components (D) and (F) are used, the component (D) should contain a halogen.

(E) a silicone halide compound

A compound represented by the general formula R'$_{4-n}$SiX$_n$ can be used, wherein: R' is hydrogen or a hydrocarbon residue; X stands for a halogen; and n is a number defined by $1 \leq n \leq 4$. Examples of this compound are SiCl$_4$, HSiCl$_3$, CH$_3$SiCl$_3$, SiBr$_4$, (C$_2$H$_5$)$_2$SiCl$_2$, and (CH$_3$)$_3$SiCl.

(F) a polymeric silicone compound

The definition of the polymeric silicone compound is the same as that specified in the production of the carrier component. The component (F) to be used in this step may be the same as or different from the compound used in the production of the carrier (A).

(2) Contact of the components (D) through (F) with the carrier component (1) Ratio of the quantities to be used The quantity of each component to be used is optionally selected provided that the effects of the present invention can be exhibited. In general, however, the quantities are preferably within the following ranges.

The quantity of the liquid titanium compound (D) is within the range of a molar ratio of from $1 \times 10^{-2}$ to 100, preferably from 0.1 to 10, to the quantity of the magnesium dihalide constituting the carrier (A).

The quantity of the silicon halide compound (E) is within the range of a molar ratio of from $1 \times 10^{-2}$ to 100, preferably from 0.1 to 10.

The quantity of the polymeric silicone compound (F) is within the range of a molar ratio of from $1 \times 10^{-3}$ to 10, preferably from 0.05 to 5.0.

(2) Method for the contact

The catalyst component of the present invention is obtained by contacting at least one of the components (D) through (F), more specifically the component(s) (D), (E), (D)+(E), (D)+(F) or (D)+(E)+(F) with the above described carrier (A).

The contact can be conducted at a temperature of generally $-100°$ to $+200°$ C., preferably $0°$ to $100°$ C. The time period of the contact is ordinarily in a range of the order of 10 minutes to 20 hours, preferably of the order of 1 to 5 hours.

The contact of the carrier (A) with the components (D) through (F) is preferably conducted under agitation. The order of contacting these components is optional as long as the effects of the present invention are attained. Any of the components (D), (E) and/or (F) can be contacted first with the carrier (A). The contact step can also be conducted in the presence of a dispersion medium or a solvent. The dispersion medium to be used may be the same as the medium used in the production of the carrier (A).

5. Polymerization of α-olefins (1) Formation of the catalyst

The present component of the present invention can be used in combination with an organic metal compound cocatalyst for polymerization of α-olefins. Any of the organic metal compounds known as cocatalysts, of which the metal is of the groups I through IV of the periodic table, can be used for the polymerization of α-olefins. Particularly, an organic aluminum compound is preferred.

The organic aluminium compound is represented, for example, by the general formula $R_{3-n}^5 AlX_n$ or $R_{3-m}^6 Al(OR^7)_m$, wherein: $R^5$, $R^6$ and $R^7$ are hydrogen or a hydrocarbon residue having 1 to about 20 carbon atoms which may be the same or different; X stands for a halogen; and n and m are numbers defined by $0 \leq n < 2$ and $0 \leq m \leq 1$, respectively. More specifically, the organic aluminum compound is exemplified by (a) a trialkylaluminum such as trimethylaluminum, triethylaluminum, triisobutylaluminum, trioctylaluminum and tridecylaluminum; (b) an alkylaluminum halide such as diethylaluminum monochloride, diisobutylaluminum monochloride, ethylaluminum sesquichloride, and ethylaluminum dichloride; (c) a dialkylaluminum hydride such as diethylaluminum hydride and diisobutylaluminum hydride; and (d) an alkylaluminum alkoxide such as diethylaluminum ethoxide, diethylaluminum butoxide and diethylaluminum phenoxide.

Other organic metal compounds such as an alkylaluminum alkoxide represented by the general formula $R_{3-a}^8 Al(OR^9)_a$ wherein a is $1 \leq a \leq 3$, and $R^8$ and $R^9$ are a hydrocarbon residue having 1 to about 20 carbon atoms which may be the same or different, can be used in combination with the above described organic aluminum compounds (a) through (c). Such a combination is exemplified by the combination of triethylaluminium and diethylaluminum ethoxide, the combination of diethylaluminum monochloride and diethylaluminum ethoxide, the combination of ethylaluminum dichloride and ethylaluminum diethoxide, and the combination of triethylaluminum and diethylaluminum chloride and diethylaluminum ethoxide.

The quantity of these organic metal compounds to be used is not especially restricted, but is preferably in a range of a ratio by weight of from 0.5 to 1,000 to the quantity of the solid catalyst component of the present invention.

(2) α-olefins

The α-olefin to be polymerized in the presence of the catalyst system of the present invention is represented by the general formula R—CH=CH$_2$, wherein R is hydrogen or a hydrocarbon residue having 1 to 10 carbon atoms and the R may contain a substituent. More specifically, the α-olefins include ethylene, propylene, butene-1, pentene-1, hexene-1, 4-methylpentene-1, and the like. In the polymerization of these α-olefins, up to 50% by weight and preferably up to 20% by weight of the above mentioned α-olefin relative to the ethylene can be copolymerized with the ethylene. Also, copolymerization of the α-olefin with a copolymerizable monomer other than the α-olefins such as vinyl acetate or a diolefin can be carried out.

(3) Polymerization

The catalyst system of the present invention can be applied to an ordinary slurry polymerization. Moreover, the catalyst system can also be applied to a liquid phase non-solvent polymerization using substantially no solvent, a solution polymerization or a gasphase polymerization, as well as to a continuous polymerization, a batch polymerization or a polymerization system including prepolymerization.

Examples of the polymerization solvents to be used in the slurry polymerization are a saturated aliphatic or aromatic hydrocarbon such as hexane, heptane, pentane, cyclohexane, benzene, toluene, and mixtures thereof. The polymerization temperatures is in a range of the order of from room temperature to 200° C., preferably from 50° to 150° C. Hydrogen can be used auxiliarily as a molecular weight modifier.

6. Examples of Experiments

The present invention will now be explained more specifically by way of the following examples.

EXAMPLE 1

Preparation of the carrier

Into a flask which had been amply purged with nitrogen was introduced 25 ml of n-heptane which had been dehydrated and deoxygenated. MgCl$_2$ (0.1 mol) and Ti(O—nC$_4$H$_9$)$_4$ (0.2 mol) were then introduced. The resulting mixture was subjected to reaction at 90° C. for 2 hours. As a result, the reaction mixture turned into a substantially liquid state.

After termination of the reaction, the reaction mixture was cooled to a temperature of 40° C., and then methylhydropolysiloxane (20 centistokes in viscosity, 0.25 mol) was added thereto. This was followed by reaction for 2 hours. A solid component separated out in the reaction system. The resulting solid component was washed with n-heptane.

Figure 2:
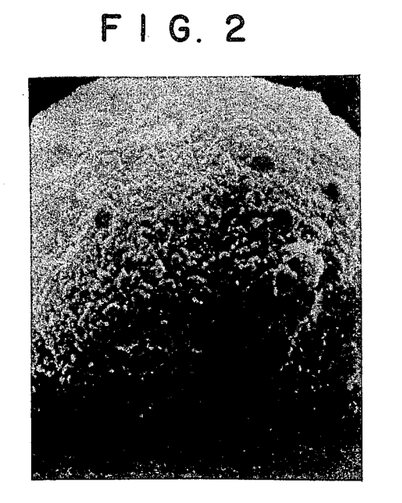
FIGS. 2 and 3 are photomicrographs, respectively of 16,000 X magnification and 60,000 X magnification taken by a scanning electron microscope, of catalyst carriers obtained in Example 1 of the invention set forth hereinafter.
Figure 3:
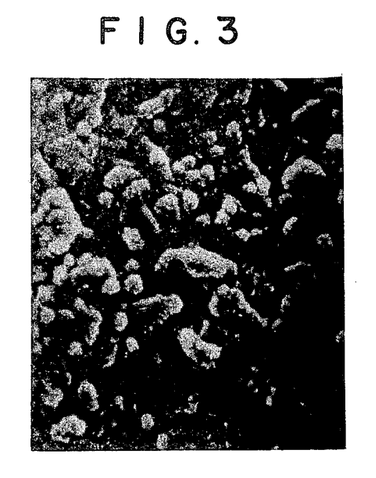
Figure 4:
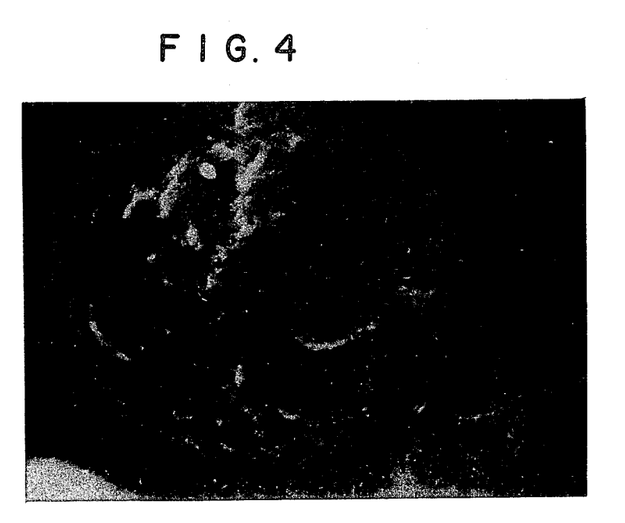
FIG. 4 is a photomicrograph, of 500 X magnification taken by a scanning electron microscope, of polymer particles obtained in Example 4 set forth hereinafter.

The photomicrographs obtained with an electron microscope of the solid component are shown in FIGS. 2 and 3. From these photomicrographs, it is seen that the shapes of the tertiary particles are approximately spherical. FIG. 2 is a photomicrograph of the catalyst carrier thus prepared which was magnified 16,000 times, and FIG. 3 is that at 60,000×magnification. It is observed that each of the tertiary particles is constituted by small secondary particles, and, further each of, the secondary particles is constituted by fine primary particles. The properties of the catalyst carrier thus prepared were as follows:

(1) the specific surface area of the carrier = 1.6 m$^2$/g,
(2) the void volume of pores of not more than 10,000 Å = 0.17 ml/g,
(3) the ratio of the average diameter of the tertiary particles to that of the secondary particles = 110, and
(4) the ratio of the specific surface area of the carrier to that of a sphere having a diameter corresponding to the particle diameter of the tertiary particles = 1.9.

EXAMPLE 2

Preparation of the carrier

The process for preparation of the catalyst carrier as described in Example 1 was repeated except that 0.22 mol of tetra-n-butyl polytitanate (degree of polymerization n=2) was used instead of Ti(O—nC$_4$H$_9$)$_4$.

The properties of the spherical carrier component thus obtained were as follows:

(1) the specific surface area of the carrier = 2.5 m$^2$/g,
(2) the void volume of pores of not more than 10,000 Å = 0.27 (ml/g),
(3) the ratio of the average diameter of the tertiary particles to that of the secondary particles = 72, and
(4) the ratio of the specific surface area of the carrier to that of a sphere having a diameter corresponding to the particle diameter of the tertiary particles = 2.7.

EXAMPLE 3

Preparation of the carrier

Into a flask which had been amply purged with nitrogen was introduced 50 ml of n-heptane which had been dehydrated and deoxygenated. 12 ml of methylhydrogenpolysiloxane were then introduced. The resulting mixture was adjusted to a temperature of 40° C. A reaction mixture which had been prepared by reacting 0.1 mol of MgCl$_2$, 0.2 mol of Ti(O—nC$_4$H$_9$)$_4$ and 50 ml of n-heptane was then introduced into the flask, after which reaction at 40° C. was carried out for 1 hour. A solid component separated out. The resulting solid component was washed with n-heptane. The properties of the spherical carrier component thus obtained were as follows:

(1) the specific surface area of the carrier = 1.7 m$^2$/g
(2) the void volume of pores of not more than 10,000 Å = 0.19 ml/g,
(3) the ratio of the average diameter of the tertiary particles to that of the secondary particles = 105, and
(4) the ratio of the specific surface area of the carrier to that of a sphere having a diameter corresponding to the particle diameter of the tertiary particles = 2.1.

EXAMPLE 4

(1) Preparation of carrier (A)

Into a flask amply purged with nitrogen was introduced 50 ml of n-heptane which had been dehydrated and deoxygenated. 0.1 mol of MgCl$_2$ and 0.2 mol of Ti(O—nBu)$_4$ were then added. The resulting mixture was subjected to reaction at 90° C. for 2 hours. After termination of the reaction, the reaction mixture was cooled to 40° C., and then 12 ml of methylhydrogenpolysiloxane (20 centistokes) was added thereto, after which reaction was carried out for 2 hours. The resulting solid component was washed with n-heptane. A portion of the washed product was taken out and subjected to a compositional analysis, whereupon the composition was found to be 14.3% Ti, 11.7% Cl, 5.3% Mg and 1.5% Si by weight. The properties were as follows:

(1) the specific surface area of the carrier = 1.2 m$^2$/g,
(2) the void volume of pores of not more than 10,000 Å = 0.20 ml/g,
(3) the ratio of the average diameter of the tertiary particles to that of the secondary particles = 110, and
(4) the ratio of the specific surface area of the carrier to that of a sphere having a diameter corresponding to the particle diameter of the tertiary particles = 1.8.

(2) Preparation of the catalyst component

Into a flask amply purged with nitrogen was introduced 50 ml of n-heptane which had been dehydrated and deoxygenated, and then the entire quantity of the carrier (A) prepared in the above described step 1 was introduced. Thereafter, 0.04 mol of TiCl$_4$ and 50 ml of n-heptane were introduced, and then 12 ml of methylhydrogenpolysiloxane was introduced into the flask. The resulting mixture was subjected to reaction at 70° C. for 2 hours. After termination of the reaction, the reaction mixture was washed with n-heptane to obtain a catalyst component. A portion of the product was taken out and subjected to a compositional analysis, the result of which was 14.9% Ti, 31.2% Cl, 5.9% Mg, and 6.6% Si, by weight. The specific surface area thereof was also measured according to the BET method and found to be 5.6 (m$^2$/g).

(3) Polymerization of ethylene

A stainless-steel autoclave 1.5 liters in capacity equipped with a stirrer and a thermostat was prepared by evacuation and nitrogen purging several times and then charged with 800 ml of n-heptane which had been amply dehydrated and deoxygenated. This step was then followed by addition thereto of 200 mg of triethylaluminum and 10 mg of the catalyst component prepared in the above described step. The mixture was warmed to 85° C., and hydrogen was introduced thereinto at a partial pressure of 4.5 kg/cm$^2$ to cause the pressure in the system to be 9 kg/cm$^2$. The mixture was subjected to reaction for 3 hours, while these reaction conditions were kept constant. The pressure, which otherwise would have been lowered as the polymerization proceeded, was maintained constant by the introduction of ethylene only. After termination of the polymerization, ethylene and hydrogen were purged, and the reaction product was taken out of the autoclave. Then the resulting polymer slurry was filtrated and then dried in a vacuum dryer for one day. Thus, 105 grams of a polymer (PE) was obtained in a yield (g PE/g of solid catalyst component) of 10,500.

The properties of the resulting polymer were measured. The melt flow ratio (MFR) at 190° C. and at a load of 2.16 kgs was 7.2. The apparent specific gravity of the polymer was 0.47 (g/cc). The angle of repose of the polymer was 35°. The shapes of the polymer was approximately spherical. The particle size distribution of the polymer was determined and are shown in the following table.

| diameter of screen opening (mesh*) | 250 | 100 | 48 | 32 |
|---|---|---|---|---|
| % by weight (through screen) | 0 | 8.0 | 91.0 | 99.8 |

*Tyler standard sieve

EXAMPLES 5 AND 6

The process for preparation of the catalyst component described in Example 4 was repeated except that the quantity of TiCl₄ introduced was changed as shown in Table 1. Polymerization of ethylene was also carried out in the same manner as in Example 4. The results are shown in Table 1.

EXAMPLES 7, 8 AND 9

The process for preparation of the catalyst component described in Example 4 was repeated except that the quantity of the methylhydrogenpolysiloxane added was changed as shown in Table 2. Polymerization of ethylene was carried out in the same way as in Example 4. The results are shown in Table 2.

EXAMPLE 10

The process for preparation of the catalyst component described in Example 4 was repeated except that the TiCl₄ and methylhydrogenpolysiloxane were diluted with 50 ml of n-heptane and then introduced into the flask. Polymerization of ethylene was carried out in the same manner as in Example 4 to obtain 95 grams of a white polymer [in a yield of 9,500 (g PE/g of solid catalyst component)]. The properties of the polymer were measured, whereupon: the MFR was 9.6; the apparent specific gravity of the polymer was 0.47 (g/cc); and the angle of repose of the polymer was 36°.

EXAMPLE 11

(1) Preparation of the catalyst component

A catalyst component was prepared as in Example 4 by using the carrier component prepared in Example 3.

The Ti content in the resulting catalyst component was 15.2% by weight.

(2) Polymerization of ethylene

Polymerization of ethylene was carried out under the conditions of Example 4 except that 300 mg of triisobutylaluminum was used as the organic aluminum component instead of triethylaluminum. Thus, 91 grams of a white polymer was obtained [in a yield of 9,100 (g PE/g solid catalyst component)]. The properties of the polymer were measured, whereupon: the MFR was 9.8; the apparent specific density was 0.46 (g/cc); and the angle of repose was 37°.

EXAMPLES 12, 13 AND 14

Polymerization of ethylene was carried out under the conditions of Example 4 except that the organic aluminum components were changed respectively as shown in Table 3. The results are shown in Table 3.

TABLE 1

| Examples | Quantity of TiCl₄ added (mol) | Yield (g PE/g catalyst component) | MFR | Apparent specific gravity of polymer (g/cc) | Angle of repose (degree) |
|---|---|---|---|---|---|
| 5 | 0.06 | 12,100 | 6.4 | 0.44 | 38 |
| 6 | 0.1 | 9,200 | 5.2 | 0.41 | 39 |
| 4 | 0.04 | 10,500 | 7.2 | 0.47 | 35 |

TABLE 2

| Examples | Quantity of MHPS* added (milligram) | Yield (g PE/g catalyst component) | MFR | Apparent specific gravity of polymer (g/cc) | Angle of repose (degree) |
|---|---|---|---|---|---|
| 7 | 8 | 13,300 | 6.9 | 0.46 | 38 |
| 8 | 16 | 9,200 | 5.2 | 0.45 | 37 |
| 9 | 24 | 9,000 | 4.8 | 0.45 | 38 |
| 4 | 12 | 10,500 | 7.2 | 0.47 | 35 |

*MHPS = methylhydrogenpolysiloxane

TABLE 3

| Example | Organic aluminum components | | | Yield (g PE/g catalyst component) | MFR | Apparent specific gravity of polymer (g/cc) | Angle of repose (degree) |
| | TEA* (mg) | DEAE* (mg) | DEAC* (mg) | | | | |
|---|---|---|---|---|---|---|---|
| 12 | 100 | 100 | 100 | 22,000 | 8.4 | 0.43 | 37 |
| 13 | — | 100 | 100 | 7,500 | 3.6 | 0.43 | 39 |
| 14 | — | — | 200 | 3,800 | 0.4 | 0.42 | 40 |
| 4 | 200 | — | — | 10,500 | 7.2 | 0.47 | 38 |

*TEA = triethylaluminum
DEAE = diethylaluminum ethoxide
DEAC = diethylaluminum chloride

EXAMPLE 15

Polymerization of a mixed ethylene-butene-1 gas

By using the solid component prepared in Example 4, polymerization was carried out under the conditions of Example 4 except that a mixed ethylene-butene-1 gas containing 7.5 molar % of butene-1 was used instead of ethylene, and the concentration of H₂ in the polymerization vessel was adjusted to 20 molar %. Thus, 178 grams of a polymer was obtained. The properties of the polymer were measured, whereupon: the MFR was 2.3, the apparent density was 0.45 (g/cc), and the density of the polymer was 0.934 (g/cm³).

EXAMPLE 16

(1) Preparation of the catalyst component

A flask amply purged with nitrogen was charged with 50 ml of n-heptane which had been dehydrated and deoxygenated and then with the whole total quantity of the carrier component (A) prepared in the same way as in Example 4. Then, 0.06 mol of TiCl₄ and 50 ml of n-heptane were introduced into the process system, which was then reacted at 70° C. for 2 hours. After termination of the reaction, the reaction product was washed with n-heptane to obtain a catalyst component. A portion thereof was taken out and subjected to a compositional analysis, the result of which was 8.3% Ti, 35.6% Cl, and 11.7% Mg by weight.

(2) Polymerization of ethylene

Polymerization of ethylene was carried out in the same manner as in Example 4 to obtain 107 grams of a polymer in a yield (g PE/g solid catalyst component) of 10,700. The properties of the polymer were measured, whereupon it was found that the MFR was 3.2; the apparent specific gravity of the polymer was 0.45 (g/cc); and the angle of repose of the polymer was 39°.

EXAMPLES 17, 18 AND 19

The process for preparation of the catalyst component described in Example 16 was repeated except that the quantity of TiCl₄ added and the reaction temperature were changed as shown in Table 4. Polymerization of ethylene was also carried out in the same manner as in Example 16. The results are shown in Table 4.

EXAMPLES 20 THROUGH 23

The polymerization of ethylene was carried out by using the catalyst described in Example 16 in the manner specified therein except that the organic aluminum components were changed as shown in Table 5. The results are shown in Table 5.

out at 50° C. for 2 hours. After termination of the reaction, the reaction product was washed with n-heptane to obtain a catalyst component. A portion thereof was taken out and subjected to a compositional analysis, whereupon it was found that the component contained 3.2% Ti, 17.5% Mg, and 49.6% Cl by weight.

(2) Polymerization of ethylene

Polymerization of ethylene was carried out using the catalyst component obtained above under the same conditions as in Example 4. Thus, 116 grams of a polymer was obtained in a yield (g PE/g solid catalyst component) of 11,600. The properties of the polymer were measured, whereupon it was found that the MFR was 13.7; the apparent specific gravity of the polymer was 0.48 (g/cc); and the angle of repose of the polymer was 36°.

EXAMPLE 25

(1) Preparation of the catalyst component

A flask amply purged with nitrogen was charged with 50 ml of n-heptane which had been dehydrated and deoxygenated, and with the total quantity of the carrier (A) prepared as in Example 4. Then, 0.05 mol of TiCl₄, 0.05 mol of SiCl₄ and 50 ml of n-heptane were introduced into the flask, after which reaction was carried out at 50° C. for 2 hours. After termination of the reaction, the reaction product was washed with n-heptane to obtain a catalyst component. A portion thereof was taken out and subjected to a compositional analysis, the result of which was 7.6% Ti, 12.7% Mg, and 44.3% Cl by weight.

(2) Polymerization of ethylene

Polymerization of ethylene was carried out as in Example 4 except that the quantity of the catalyst component was decreased to 5 milligrams. Thus, 121 grams of

TABLE 4

| | TiCl₄ Reaction conditions | | | | | | |
|---|---|---|---|---|---|---|---|
| Example | Quantity added (mol) | Reaction temp. (°C.) | Ti content in catalyst (% by wt.) | Yield (g PE/g solid catalyst) | MFR (g/10 min.) | Apparent specific gravity of polymer (g/cc) | Angle of repose of polymer (degree) |
| 17 | 0.04 | 70 | 9.6 | 5,000 | 2.1 | 0.43 | 40 |
| 18 | 0.1 | 50 | 10.7 | 26,000 | 15.0 | 0.43 | 39 |
| 19 | 0.15 | 50 | 12.4 | 20,000 | 13.0 | 0.42 | 39 |
| 16 | 0.06 | 70 | 8.3 | 10,700 | 3.2 | 0.45 | 39 |

TABLE 5

| | Organic aluminum components | | | Yield | | Apparent specific | Angle of |
|---|---|---|---|---|---|---|---|
| Example | TEA*⁻¹ (mg) | DEAE*⁻² (mg) | DEAC*⁻³ (mg) | (g PE/g catalyst component) | MFR | gravity of polymer (g/cc) | repose (degree) |
| 20 | 100 | — | 25 | 17,000 | 15.0 | 0.44 | 40 |
| 21 | 100 | 100 | 100 | 20,000 | 14.2 | 0.42 | 40 |
| 22 | — | 100 | 100 | 7,500 | 2.6 | 0.39 | 41 |
| 23 | — | — | 100 | 5,100 | 0.8 | 0.40 | 40 |
| 16 | 100 | — | — | 10,700 | 3.2 | 0.45 | 39 |

*⁻¹triethylaluminum
*⁻²diethylaluminum ethoxide
*⁻³diethylaluminum chloride

EXAMPLE 24

(1) Preparation of the catalyst component

A flask amply purged with nitrogen was charged with 50 ml of n-heptane which had been dehydrated and deoxygenated. The total quantity of the carrier (A) prepared as in Example 4 was introduced into the flask. Then, 0.06 mol of SiCl₄ and 50 ml of n-heptane were introduced thereinto, after which reaction was carried a polymer was obtained in a yield (g PE/g solid catalyst component) of 24,200. The properties of the polymer were measured, whereupon it was found that the MFR was 12.4; the apparent specific gravity of the polymer was 0.42 (g/cc); and the angle of repose of the polymer was 39°.

EXAMPLES 26 AND 27

Catalyst components were prepared under the conditions of the process for preparation of the catalyst component described in Example 25 except that the quantities of TiCl$_4$ and SiCl$_4$ added and the reaction temperatures were changed as shown in Table 6. Polymerization of ethylene was also carried out in the same manner. The results are shown in Table 6.

EXAMPLE 28

A catalyst component was prepared as described in Example 25 except that 0.03 mol of TiCl$_4$, 0.01 mole of SiCl$_4$, and 12 ml of methylhydrogenpolysiloxane were introduced instead of TiCl$_4$ and SiCl$_4$, and the reaction was carried out at 70° C. for 2 hours. Polymerization of ethylene was also conducted in the same manner. Thus, 45 grams of a polymer was obtained in a yield (g PE/g solid catalyst component) of 9,000. The properties of the polymer were measured to find that the MFR was 12.5; the apparent specific gravity was 0.44 (g/cc); and the angle of repose of the polymer was 38°.

EXAMPLES 29, 30 AND 31

Polymerization of ethylene was carried out as in Example 25 by using the catalyst components, corresponding to the catalyst component of Example 25, wherein the organic aluminum components were respectively changed as shown in Table 7. The results are shown in Table 7.

EXAMPLE 33

(1) Preparation of the catalyst component

A solid component (A) was prepared in the same manner as in Example 25. Into the flask were introduced 50 ml of n-heptane and 0.04 mol of SiCl$_4$, after which reaction was carried out at 50° C. for 2 hours. After termination of the reaction, the reaction mixture was washed with n-heptane. Then, 50 ml of n-heptane and 0.1 mol of TiCl$_4$ were introduced thereinto, and the resulting mixture was subjected to reaction at 50° C. for 2 hours. After termination of the reaction, the reaction product was washed with n-heptane to obtain a catalyst component. A portion thereof was taken out and subjected to a compositional analysis to find that it contained 5.2% Ti, 17.4% Mg, and 65.3% Cl by weight.

(2) Polymerization of ethylene

Polymerization of ethylene was carried out under the same conditions as in Example 25. Thus, 158 grams of a polymer was obtained in a yield (g PE/g solid catalyst component) of 31,600. The properties of the polymer were measured to find that the MFR was 6.7; the apparent specific gravity was 0.38 (g/cc); and the angle of repose of the polymer was 39°.

EXAMPLE 34

This example illustrates polymerization of propylene. The autoclave used in Example 25 was charged with 800 ml of n-heptane which had been amply dehydrated and deoxygenated and then with 385 mg of triethylalu-

TABLE 6

| Example | TiCl$_4$ & SiCl$_4$ Reaction Conditions | | | Yield (g PE/g solid catalyst component) | MFT (g/10 min.) | Apparent specific gravity of polymer (g/cc) | Angle of repose of polymer (degree) |
|---|---|---|---|---|---|---|---|
| | Quantity of TiCl$_4$ (mol) | Quantity of SiCl$_4$ (mol) | Reaction temp. (°C.) | | | | |
| 25 | 0.05 | 0.05 | 50 | 24,200 | 12.4 | 0.42 | 39 |
| 26 | 0.025 | 0.075 | 30 | 22,000 | 9.3 | 0.42 | 38 |
| 27 | 0.075 | 0.025 | 50 | 25,000 | 25 | 0.46 | 37 |

TABLE 7

| Example | Quantities of organic aluminum components introduced | | | | Yield (g PE/g solid catalyst component) | MFR (g/10 min.) | Apparent specific gravity of polymer (g/cc) | Angle of repose of polymer (degree) |
|---|---|---|---|---|---|---|---|---|
| | TEA*-1 (mg) | TiBA*-2 (mg) | DEAC*-3 (mg) | DEAE*-4 (mg) | | | | |
| 29 | — | 150 | — | — | 21,000 | 10.5 | 0.41 | 39 |
| 30 | 85 | — | 15 | — | 37,000 | 13.5 | 0.39 | 41 |
| 31 | 50 | — | 50 | 50 | 41,000 | 13.8 | 0.39 | 41 |
| 25 | 100 | — | — | — | 24,200 | 12.4 | 0.42 | 39 |

*-1 triethylaluminum
*-2 triisobutylaluminum
*-3 diethylaluminum chloride
*-4 diethylaluminum ethoxide

EXAMPLE 32

This example illustrates the polymerization of a mixed ethylene-butene-1 gas.

By the use of the solid component prepared in Example 28, polymerization was carried out as in Example 28 except that a mixed ethylene-butene-1 gas containing 7.5 molar % of butene-1 was used instead of ethylene, and the concentration of H$_2$ in the reaction vessel was adjusted to 20 molar %. Thus, 210 grams of a polymer was obtained. The properties of the polymer were measured to find that the MFR was 1.7; the apparent specific gravity of the polymer was 0.935 (g/cc); and the angle of repose of the polymer was 38°.

minum, 123 mg of ethyl p-toluate, and 19 mg of the catalyst component prepared in Example 26. Polymerization was carried out at 65° C. and under 9 kg/m$^2$ for 2 hours. Thus, 24 grams of a polymer was obtained. The T-I.I was 78% by weight, and the product I.I was 91% by weight.

COMPARATIVE EXAMPLE 1

Preparation of a carrier

A flask amply purged with nitrogen was charged with 200 ml of n-heptane which had been dehydrated and deoxygenated and then with MgCl$_2$ (0.1 mol) and BuOH (0.06 mol), after which reaction was carried out at 60° C. for 2 hours. Dissolution of MgCl$_2$ was not observed.

The reaction product was thoroughly washed with n-heptane to obtain a solid component. As observed under an electron microscope, the solid component was found to be in the state of a mixture of ununiform shapes from chips to spheroids. The properties thereof were as follows:

(1) the specific surface area of the carrier=58 m$^2$/g,
(2) the void volume of pores of not more than 10,000 Å=1.2 ml/g,
(3) the ratio of the average diameter of the tertiary particles to that of the secondary particles=3.3, and
(4) the ratio of the specific surface area of the carrier to that of a sphere having a diameter corresponding to the particle diameter of the tertiary particles=145.

COMPARATIVE EXAMPLE 2

Preparation of a carrier

Twenty (20) grams of anhydrous MgCl$_2$ was ground for 24 hours by means of a vibration mill. As observed under an electron microscope, most of the resulting solid component was in the form of chips, and particles of spherical shape were not observed. The properties of the solid component were as follows:

(1) the specific surface area of the carrier=81 m$^2$/g,
(2) the void volume of pores of not more than 10,000 Å=0.15 ml/g,
(3) the ratio of the average diameter of the tertiary particles to that of the secondary particles=55, and
(4) the ratio of the specific surface area of the carrier to that of a sphere having a diameter corresponding to the particle diameter of the tertiary particles=297.

COMPARATIVE EXAMPLE 3

The carrier component obtained in Comparative Example 1 was treated with TiCl$_4$ to obtain a catalyst component. Polymerization of ethylene was carried out with the use of the catalyst component under the same conditions as in Example 4 to obtain 187 grams of a polymer. The shape of the particles of the resulting polymer was not spherical but was a mixture of the shapes of chips and spheroids. The properties thereof were measured with the result that the apparent specific gravity of the polymer was 0.35 (g/cc), and the angle of repose of the polymer was 48°.

Note
A: Kubo et al: "A Pulverurent Body-Theory and Application" (Funtai-Riron to Ooyo) pp 513–518, published by Maruzen, Japan.
B: Yoneda: "Catalyst Engineering Lectures 4, Basic determination of catalyst" (Shokubai Kogaku Koza 4, Shokubai Kiso Sokutei Ho) pp 70–73, published by Chijin Shokan.

What is claimed is:

1. A carrier of a catalyst for polymerization of olefins which is a catalyst carrier of solid particles produced from a magnesium halide, characterized in that the carrier is composed of tertiary particles each constituted by a large number of fine secondary particles, each of said secondary particles is constituted by a large number of very fine primary particles included therein, and the carrier composed of said tertiary particles has:

(a) a specific area in a range of 0.1 to 10 m$^2$/g,
(b) a void volume formed by pores of not more than 10,000 Å of not more than 0.5 ml/g,
(c) a ratio of the average diameter of the tertiary particles to that of the secondary particles in a range of 50 to 200, and
(d) a ratio of the specific surface area of the carrier to that of a sphere having a diameter corresponding to the particle diameter of the tertiary particles in a range of 1 to 10.

2. The carrier according to claim 1, in which the specific surface area is in the range of 0.5 to 5 m$^2$/g.

3. The carrier according to claim 1, in which the void volume formed by the pores of not more than 10,000 Å is not more than 0.3 ml/g.

4. The carrier according to claim 1, in which the ratio of the average diameter of the teriatry particles to that of the secondary particles is in a range of 100 to 150.

5. The carrier according to claim 1, in which the carrier has:

(a) a specific area in a range of 0.5 to 5 m$^2$/g,
(b) a void volume formed by pores of not more than 10,000 Å of not more than 0.3 ml/g,
(c) a ratio of the average diameter of the tertiary particles to that of the secondary particles in a range of 100 to 150, and
(d) a ratio of the specific surface area of the carrier to that of a sphere having a diameter corresponding to the particle diameter of the tertiary particles in a range of 1 to 10.

6. A catalyst component for polymerization of olefins which is prepared by contacting at least one component of three components (D), (E) and (F) with the catalyst carrier of any of claims 1 through 5, the component (D) being a liquid titanium compound, which must contain a halogen in the case where this component is used alone or in combination with the component (F),
the component (E) being a silicon halide compound, and
the component (F) being a polymeric silicone compound having a structural unit represented by the formula wherein R° is a hydrocarbon residue.

7. A process for producing a carrier of a catalyst for polymerization of olefins, which comprises preparing a homogeneous solution by contacting (a) a magnesium dihalide with (b) a titanic acid ester or a polytitanic acid ester, contacting the resulting homogeneous solution with (c) a polymeric silicone compound, and separating out a solid carrier component.

8. The process according to claim 7, in which the ratio of (b)/(a) in the homogeneous solution is in a range of from 1 to 20 and the polymeric silicone compound is used in such a ratio that (c)/(b) is in a range of from 1 to 20.

9. The process according to claim 8, in which the ratio (b)/(a) is from 2 to 5, and the ratio (c)/(b) is from 1 to 5.

10. The process according to claim 7, in which the steps of contacting the components (a), (b) and (c) are carried out at a temperature of 0° to 100° C.

11. A process for producing a catalyst component for polymerization of olefins which comprises:

the steps of contacting (a) a magnesium dihalide with (b) a titanic acid ester or a polytitanic acid ester to prepare a homogeneous solution thereof, and contacting (c) a polymeric silicone compound with the resulting homogeneous solution to separate out a carrier, and a step of contacting at least one component of three components (D), (E) and (F) with the resulting carrier, the component (D) being a liquid titanium compound which must contain a halogen in the case where this component is used alone or in combination with the component (F), the component (E) being a silicone halide compound, and the component (F) being a polymeric silicone compound having a structural unit represented by the formula wherein R° is a hydrocarbon residue.

12. The process according to claim 11, in which $TiCl_4$ is contacted with the homogeneous solution.

13. The process according to claim 11, in which $TiCl_4$ and $SiCl_4$ are contacted with the homogeneous solution.

14. The process according to claim 11, in which the ratio of (b)/(a) is in a range of from 2 to 10 and the ratio of (c)/(b) is in a range of from 1 to 20.

15. The process according to claim 11, in which the ratio of (b)/(a) is in a range of from 2 to 5 and the ratio of (c)/(b) is in a range of from 2 to 5.

* * * * *